United States Patent [19]
Barnholt

[11] Patent Number: 5,531,653
[45] Date of Patent: Jul. 2, 1996

[54] SELECTIVELY LOCKABLE DIFFERENTIAL ASSEMBLY

[75] Inventor: Mark C. Barnholt, Fort Wayne, Ind.

[73] Assignee: Dana Corporation, Toledo, Ohio

[21] Appl. No.: 372,109

[22] Filed: Jan. 13, 1995

[51] Int. Cl.⁶ .................................................. F16H 48/22
[52] U.S. Cl. .......................................... 475/234; 475/239
[58] Field of Search .................................... 475/231, 234, 475/237, 238, 239

[56] References Cited

U.S. PATENT DOCUMENTS

| | | | |
|---|---|---|---|
| 2,234,592 | 3/1941 | Fitzner | 74/315 |
| 2,424,942 | 7/1947 | Mynssen | 74/315 |
| 2,501,956 | 3/1950 | Misener | 74/710.5 |
| 3,837,236 | 9/1974 | Kagata | 475/240 |
| 4,526,063 | 7/1985 | Oster | 74/710.5 |
| 4,679,463 | 7/1987 | Ozaki et al. | 475/240 |
| 4,825,724 | 5/1989 | Shibuya et al. | 475/232 |
| 5,125,876 | 6/1992 | Hirota | 475/231 |

Primary Examiner—Charles A. Marmor
Assistant Examiner—Sherry Estremsky
Attorney, Agent, or Firm—Oldham & Oldham Co.

[57] ABSTRACT

A selectively lockable differential assembly comprising a rotatable case, first and second output shafts journalled in the case for rotation relative thereto, and a differential mechanism disposed within the case and linking the two output shafts so as to permit differential rotation between the two shafts. The assembly further includes first and second clutches each connected to the case and coupled with one of the output shafts. The differential mechanism includes a pinion shaft, upon which spaced apart pinion gears are rotatably mounted, and a pair of side gears rigidly affixed to corresponding ones of the output shafts, which meshingly engage the pinion gears. The pinion shaft includes a cam portion disposed between the inboard ends of the two output shafts. Rotation of the pinion shaft about its longitudinal centerline axis engages the two clutches and therefore limits differential rotation between the two output shafts. The pinion shaft is rotated by an actuator assembly which includes a shift arm extending through a window formed in the case and having one end attached to the pinion shaft and the opposite end engaging a shift collar piloted on an exterior surface of the case. A shift fork partially encircles the shift collar and is attached to a linear actuator which preferably comprises a vacuum motor. The differential assembly may be rotatably supported within an axle carrier housing or a transfer case.

20 Claims, 3 Drawing Sheets

SELECTIVELY LOCKABLE DIFFERENTIAL ASSEMBLY

BACKGROUND OF THE INVENTION

1. Field of the Invention

The present invention relates generally to a differential assembly and, more particularly, to a selectively lockable differential assembly for use in the drivetrain of a motor vehicle.

2. Related Art

Limited slip differentials are commonly used in the automotive industry for the purpose of enhanced vehicle mobility, by diverting torque to the wheel with the greatest traction, during periods when one wheel slips due to contact with a low coefficient surface. Limited slip differentials typically include one or more clutch packs which may be passively preloaded as a result of the differential gear separation forces which vary with applied torque to the differential or may be selectively locked, so as to limit or prevent differential rotation between the two output shafts of the differential. Prior lockable differentials have included those incorporating parallel-axis differential gears, such as spur or helical gears, and a magnetic or hydraulic power source for activating the clutch pack. The spur and helical gears used in such differentials, may lack sufficient impact strength for particular applications.

Another known lockable differential utilizes bevel gears which are inherently stronger than the aforementioned parallel-axis gears. In this known system, the differential clutch pack is hydraulically activated.

At the time of the present invention, automotive design engineers continue to search for new and improved selectively lockable differentials.

SUMMARY

Accordingly, the present invention is directed to a selectively lockable differential assembly. According to a preferred embodiment, the assembly comprises a rotatable case and first and second output shafts journalled in the case for rotation relative thereto. The assembly further comprises a differential mechanism disposed within the case and linking the first and second output shafts so as to permit differential rotation therebetween. Additionally, the assembly includes first and second clutches each connected to the case and coupled with one of the output shafts. Engagement of at least one of the clutches limits differential rotation between the two output shafts. The differential mechanism includes a pinion shaft having a longitudinal centerline axis and a cam portion disposed between the first and second output shafts. The pinion shaft is supported within the case for rotation therewith and so as to permit rotation relative to the case about the centerline axis of the shaft. The rotation of the pinion shaft about its centerline axis from an unlocked position to a locked position causes the cam portion to contact the first and second shafts resulting in engagement of at least one of the first and second clutches thereby limiting differential rotation between the first and second output shafts.

A main advantage of the present invention is the use of a simple and cost effective mechanism for selectively locking differentials of a limited slip-type which permits the use of higher strength bevel differential gears within the envelope of the differential assembly case.

BRIEF DESCRIPTION OF THE DRAWINGS

The aforementioned advantage, as well as the structural features and functions, and other advantages of the present invention, will become more apparent from the subsequent detail description of the preferred embodiments when taken in conjunction with the accompanying drawings, wherein.

DETAILED DESCRIPTION

Figure 1:
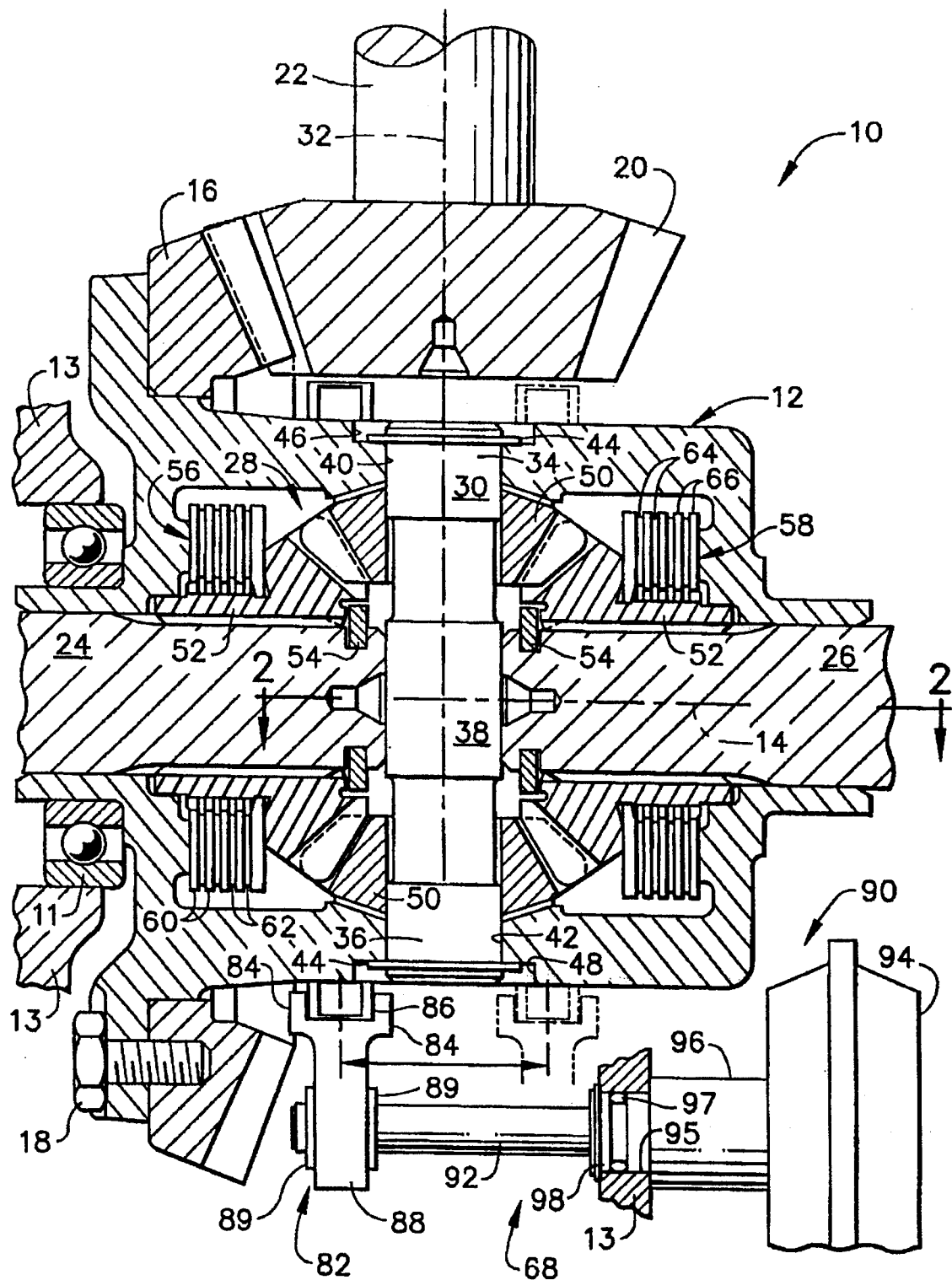
FIG. 1 is a top view, in cross-section, illustrating the differential assembly of the present invention.

Referring now to the drawings, FIG. 1 is a top view, in cross-section illustrating a selectively lockable, limited-slip differential assembly 10 according to the present invention. Assembly 10 includes a case 12 which is rotatably supported within an axle carrier 13 or housing (partially shown), via a first bearing assembly 11 and a second bearing assembly (not shown), so as to permit case 12 to rotate about a horizontal centerline axis 14 of assembly 10. An annular face gear 16 is attached to case 12 by conventional means such as bolts 18. Accordingly, face gear 16 rotates with case 12 about the horizontal centerline axis 14. Face gear 16 meshingly engages a drive pinion gear 20 which is rigidly affixed to one end of a pinion stem 22 which in turn is coupled to the vehicle drive shaft (not shown). Assembly 10 further includes output shafts 24 and 26 journalled in case 12 so that shafts 24 and 26 may rotate relative to case 12. In the embodiment illustrated in FIG. 1, the differential assembly 10 may comprise either a front or rear differential assembly of a vehicle. The output shafts 24 and 26 comprise axle output shafts and may terminate in a flange which is bolted directly to the corresponding vehicle wheel when assembly 10 is used in a beam axle configuration, or alternatively, may terminate in a flange which is bolted to a corresponding axle half shaft when assembly 10 is used in an independent axle configuration. Due to the meshing engagement of drive pinion 20 with face gear 16, torque is transferred from pinion stem 22 to output shafts 24 and 26 via a differential mechanism, indicated generally at 28, which is disposed within case 12. The differential mechanism 28 links output shafts 24 and 26 to one another so as to permit differential rotation between shafts 24 and 26, which is required during certain operating conditions such as vehicle cornering. Differential mechanism 28 includes a pinion shaft 30, which may be referred to as a cross pin shaft, supported within case 12 in such a manner that shaft 30 rotates with case 12 about the horizontal centerline axis 14 of assembly 10 and also is free to rotate relative to case 12 about a longitudinal centerline axis 32 of shaft 30. Shaft 30 includes first and second generally cylindrical end portions 34 and 36, respectively, and a cam portion 38 which is generally centrally disposed intermediate end portions 34 and 36. End portion 34 is disposed in a stepped bore 40 formed in case 12. Similarly, end portion 36 is disposed in a stepped bore 42 formed in case 12. Assembly 10 further includes a pair of snap rings 44 which are attached to pinion shaft 30. One of the snap rings 44 is attached to the end portion 34 of shaft 30 and is disposed in an enlarged diameter outer portion 46 of stepped bore 40 in case 12. The other snap ring 44 is attached to the end portion 36 of shaft 30 and is disposed in an enlarged diameter outer portion 48 of bore 42 in case 12. The two snap rings 44 cooperate with the enlarged diameter outer portions 46 and 48 of bores 40 and 42, respectively, in case 12 so as to prevent translation of shaft 30 in a direction substantially parallel to the longitudinal centerline axis 32 of shaft 30.

The differential mechanism 28 further includes a pair of pinion gears 50 rotatably mounted on the shaft 30. As shown in FIG. 1, the two pinion gears 50 are longitudinally spaced apart on shaft 30. Mechanism 28 also includes a pair of side gears 52, which are preferably bevel gears due to the superior impact strength of bevel gears as compared to spur and helical gears. One of these bevel side gears 52 is rigidly affixed to an inboard end of output shaft 24, while the other bevel side gear 52 is rigidly affixed to the inboard end of output shaft 26. Each of the bevel side gears 52 meshingly engage both of the pinion gears 50. Accordingly, rotation of case 12 and pinion shaft 30 about the centerline axis 14 results in rotation of output shafts 24 and 26. The interrelationship among pinion gears 50, side gears 52 and output shafts 24 and 26 permits differential, or relative rotation to exist between output shafts 24 and 26. Assembly 10 further includes a pair of C-rings 54. Each of the C-rings 54 is attached to one of the output shafts 24 and 26, with each ring 54 being positioned in a groove formed in the inboard end of the corresponding shaft 24 and 26 and disposed in abutting relationship with the corresponding one of the side gears 52. The C-rings 54 prevent the side gears 52 from sliding in an axially inboard direction and serve to transfer axial forces from shafts 24 and 26 to the corresponding ones of side gears 52, for a subsequently discussed purpose. Assembly 10 further includes first and second clutches 56 and 58, respectively. Clutch 56 is connected to case 12 and coupled with output shaft 24 and similarly, clutch 58 is connected to case 12 and coupled with the output shaft 26. More specifically, clutch 56 includes a first plurality of friction plates, or clutch disks 60, which are keyed or splined to the side gear 52 which is affixed to output shaft 24. Clutch 56 further includes a second plurality of friction plates, or clutch disks 62 which are keyed, or splined to case 12. Individual ones of the plurality of disks 60 and 62 are interleaved with one another. When clutch 56 is engaged, plates 60 and 62 are compressed into frictional engagement with one another thereby rotatably coupling output shaft 24 and the side gear 52 affixed thereto with case 12. Similarly, clutch 58 includes a first plurality of friction plates, or clutch disks 64 which are keyed or splined to the side gear 52 affixed to output shaft 26 and a second plurality of disks 66 which are keyed or splined to case 12. When clutch 58 is engaged, so that plates 64 and 66 frictionally interact with one another, output shaft 26 and the side gear 52 affixed thereto are rotatably coupled with case 12.

Figure 2:
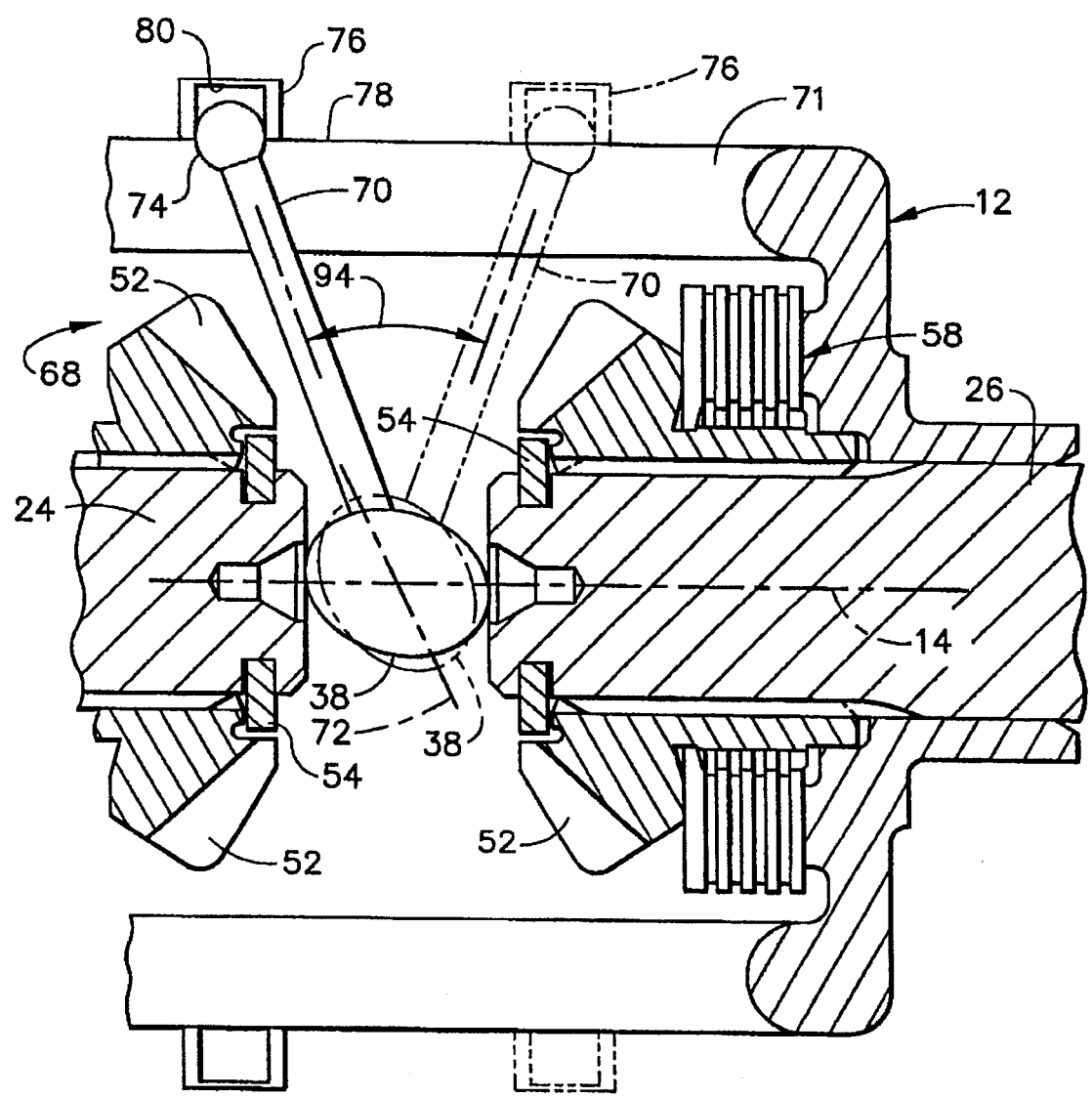
FIG. 2 is a fragmentary sectional view taken along line 2—2 in FIG. 1.

Assembly 10 further includes an actuator assembly, indicated generally at 68, which is effective for rotating pinion shaft 30 about longitudinal centerline axis 32 between an unlocked position shown in phantom in FIG. 2 and a locked position shown in solid in FIG. 2. Actuator assembly 68 includes a shift arm 70 extending through a window 71 formed in case 12 and having a first end 72 attached to the pinion shaft 30, and a second, ball-shaped end 74 which engages an annular shift collar 76 piloted on a generally cylindrical exterior surface 78 of case 12. Shift collar 76 is disposed about surface 78 of case 12 in a slip-fit so as to permit translation of collar 76 relative to case 12, with the translation of collar 76 enhanced by the lubricant (not shown) which bathes case 12 within axle carrier 13. Shift collar 76 includes a generally U-shaped channel 80 facing toward the exterior surface 78 of case 12, with the ball-shaped end 74 of shift arm 70 being disposed in channel 80. Actuator assembly 68 further includes a shift fork 82 extending circumferentially about the external surface 78 of case 12, so as to partially encircle shift collar 76. Shift fork 82 extends circumferentially over an arc preferably ranging from 160 degrees to 200 degrees and is most preferably approximately 180 degrees, to provide the desired engagement with shift collar 76 when actuated, i.e., to prevent cocking of shift collar 76. Shift fork 82 includes spaced apart prongs 84 forming a portion of generally U-shaped channel 86. Shift collar 76 is disposed in channel 86 of shift fork 82 so that any axial translation of shift fork 82 causes one of the prongs 84 to be in contacting engagement with shift collar 76, thereby causing shift collar 76 to translate with shift fork 82. Shift fork 82 further includes a web portion 88 which is attached to a linear actuator, indicated generally at 90, via a pair of snap rings 89 which are disposed about rod 92 adjacent each side of web 88. Linear actuator 90 preferably comprises a vacuum motor having a reciprocating rod 92 attached to web portion 88 of shift fork 82. Alternatively, linear actuator 90 may comprise a hydraulic actuator having a reciprocating rod attached to web portion 88, or any other suitable actuator which may impart translating motion to shift fork 82 including those actuators which may utilize spring loaded rods or rods actuated by solenoid valves. In the illustrated embodiment, a diaphragm (not shown) is generally centrally disposed within housing 94 of actuator 90 and is coupled with rod 92. When one side of housing 94 is evacuated the differential pressure across the diaphragm causes rod 90 to translate to a fully extended position as shown in FIG. 1 (corresponding to the locked position of actuator assembly 68) or alternatively to a fully retracted position with rod 92 telescoping through an opening 95 formed through the wall of axle carrier 13 and into canister 96 of actuator 90. An O-ring 97 is disposed within the opening 95 formed through the wall of axle carrier 13 so as to prevent the escape of lubricant from within carrier 13. A snap ring 98 is attached to rod 92 so as to establish the fully extended position of rod 92. As rod 92 reciprocates, shift fork 82 and shift collar 76 are forced to translate between the unlocked position shown in phantom in FIGS. 1 and 2 and the locked position shown in solid in FIGS. 1 and 2. Due to the interrelationship among shift collar 76, shift arm 70 and pinion shaft 30, the axial translation of shift collar 76 causes pinion shaft 30 to rotate about its centerline axis 32 through an angle 94 which is illustrated as extending between the locked and unlocked portions of shift arm 70 in FIG. 2. As shown in FIG. 2, the cam portion 38 of pinion shaft 30 has a generally elliptically-shaped cross-section. When pinion shaft 30 is rotated from the unlocked to the locked position, due to a corresponding translation of shift fork 82 and shift collar 76, cam portion 38 of shaft 30 is forced against the output shafts 24 and 26. The axial forces applied to shafts 24 and 26 due to the contacting engagement of cam portion 38 with shafts 24 and 26, is transferred through C-rings 54 to side gears 52 which in turn transfer the axial forces to clutches 56 and 58, so as to engage clutches 56 and 58. The axial force applied to clutch 56 forces plates 60 and 62 into frictional engagement with one another, thereby coupling shaft 24 and the corresponding side gear 52 with case 12, for rotation therewith. Similarly, the engaging axial force applied to clutch 58 forces plates 64 and 66 into frictional engagement with one another so as to couple the output shaft 26 and the corresponding side gear 52 with case 12 for rotation therewith. When either one, or both of the clutches 56 and 58 are engaged, differential rotation between the output shafts 24 and 26 is limited and may be prevented altogether. The axial, clutch-engaging forces created by the camming action of pinion shaft 30 against output shafts 24 and 26 supplements the axial forces or preload applied to clutches 56 and 58 as a result of the gear separation forces created by the meshing engagement of pinion gears 50 and side gears 52 which varies with torque applied to the differential mechanism 28. Thus, the differential assembly 10 may be selectively locked by translating shift fork 82 and shift collar 76 from an unlocked to a locked position so as to rotate pinion shaft 30 to a corresponding locked position, thereby engaging clutches 56 and 58 with sufficient force to cause output shafts 24 and 26 to rotate at the same speed as case 12. It is desirable to lock the differential assembly 10 during certain operating conditions when one wheel is slipping due to contact with a low coefficient surface so as to transfer torque to the wheel with the greatest traction, thereby allowing continued motion of the vehicle. The aforementioned means for engaging clutches 56 and 58 comprising actuator assembly 68 and the specific construction of shaft 30 including cam portion 38, comprises a central feature of the present invention. The use of actuator assembly 68 and cam portion 38 of shaft 30 to apply axial forces to shafts 24 and 26, resulting in the engagement of clutches 56 and 58, provides a more space-efficient means of engaging clutches 56 and 58 as compared to magnetic or hydraulic clutch actuators. Accordingly, side gears 52 may comprise bevel gears, instead of spur or helical gears, thereby affording the advantage of the superior impact strength of the bevel gears.

Figure 3:
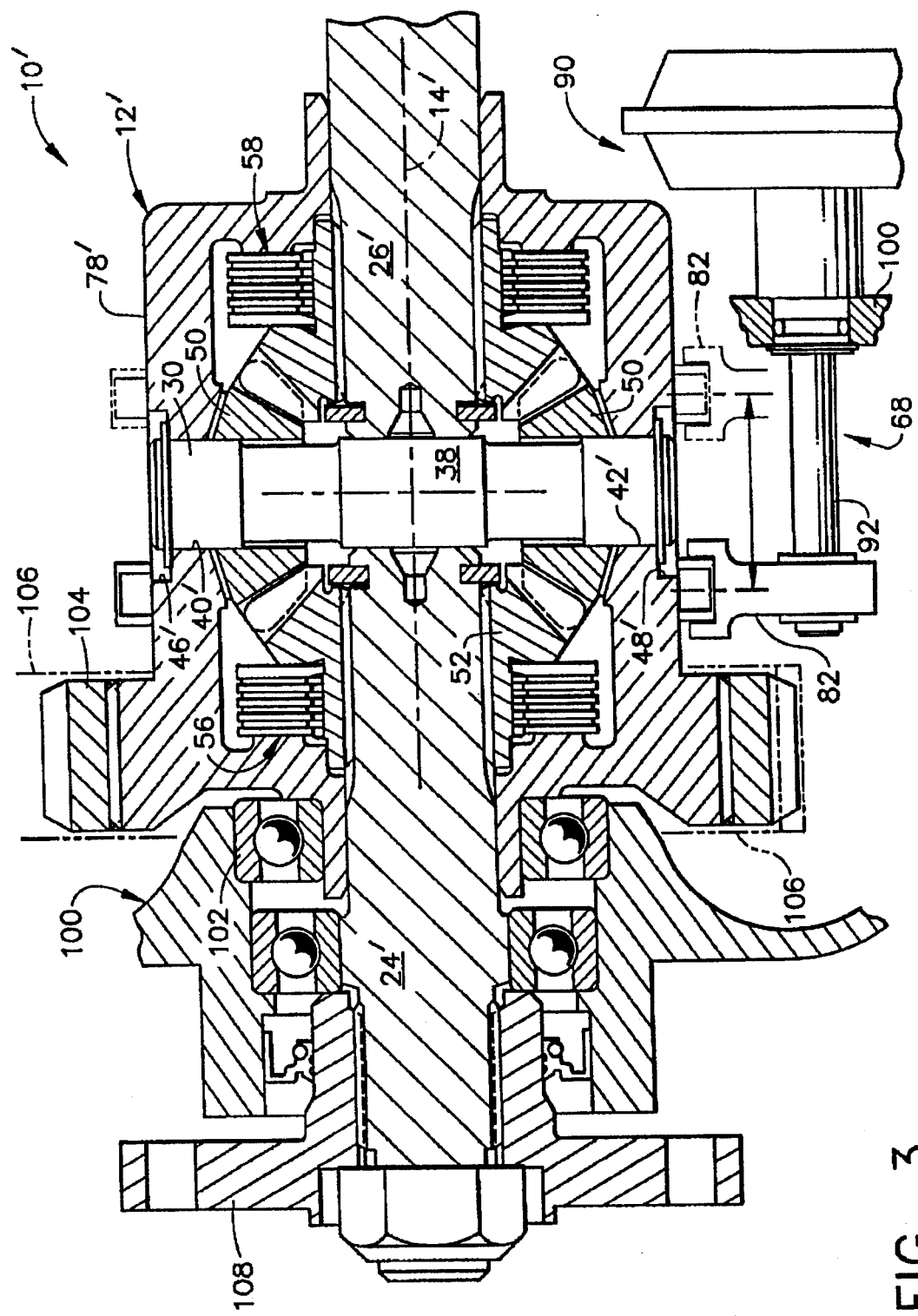
FIG. 3 is a cross-sectional view illustrating the differential assembly according to an alternative embodiment of the present invention.

Referring now to FIG. 3, a selectively lockable differential assembly 10' is illustrated according to an alternative embodiment of the present invention. In this embodiment, assembly 10' is rotatably mounted in a transfer case 100 (shown in part in FIG. 3) via a first bearing assembly 102 and a second bearing assembly mating with the portion of transfer case 100 which is not shown in FIG. 3. Assembly 10' includes a case 12' which is rotatable about a horizontal centerline axis 14'. Case 12' is substantially the same as case 12 of assembly 10 with the exception that the annular face gear 16 of assembly 10 is replaced by a drive sprocket 104 which is attached to case 12'. Torque is transferred to case 12' via drive sprocket 104 and a drive chain 106 which engages drive sprocket 104 and a mating drive sprocket (not shown) formed on a driving member, comprising an input shaft (not shown), of the transfer case. Alternatively, case 12' could be rotatably driven by a gear train in lieu of drive sprocket 104, drive chain 106 and the mating drive sprocket (not shown). Like assembly 10, assembly 10' includes two output shafts 24' and 26' which are adapted for use with transfer case 100 and preferably comprise front and rear output shafts, respectively, of a four-wheel drive vehicle. Front output shaft 24' is drivingly connected to a front drive shaft (not shown) of the vehicle via flange member 108 which is rigidly affixed to shaft 24'. Rear output shaft 26' may be similarly connected to a rear drive shaft (not shown) of the vehicle. The remaining structural features of assembly 10', including pinion shaft 30 and actuator assembly 68, are the same as illustrated and discussed previously with respect to assembly 10. Additionally, assembly 10' functions in the same manner as assembly 10. It is noted that shift collar 76 and shift fork 82 are mounted externally of case 12' but within transfer case 100. Similar to assembly 10, rod 92 of actuator 90 telescopes within transfer case 100, but the remaining elements of linear actuator 90 are positioned outside of transfer case 100.

While the foregoing description has set forth the preferred embodiments in particular detail it must be understood that numerous modifications, substitutions and changes can be undertaken without departing from the true spirit and scope of the present invention as defined by the ensuing claims. The invention is therefore not limited to specific preferred embodiments as described, but is only limited as defined by the following claims.

What is claimed is:

1. A selectively lockable differential assembly comprising: a rotatable case;

first and second output shafts journalled in said case for rotation relative thereto;

a differential mechanism disposed within said case and linking said first and second output shafts so as to permit differential rotation therebetween;

at least one clutch connected to said case and coupled with one of said output shafts, wherein engagement of said at least one clutch limits differential rotation between said shafts;

wherein said differential mechanism includes a pinion shaft having a longitudinal centerline axis and a cam portion disposed between said first and second output shafts, said pinion shaft being supported within said case for rotation therewith and so as to permit rotation relative to said case about said centerline axis;

wherein rotation of said pinion shaft about said centerline axis from an unlocked position to a locked position causes said cam portion to contact said first and second output shafts resulting in engagement of said at least one clutch thereby limiting differential rotation between said first and second output shafts.

2. The selectively lockable differential assembly as recited in claim 1, further comprising:

an actuator assembly capable of rotating said pinion shaft between said locked and unlocked positions.

3. The selectively lockable differential assembly as recited in claim 2, wherein said actuator assembly comprises:

an annular shift collar piloted on an exterior surface of said case;

a shift arm having a first end attached to said pinion shaft and a second end engaging said shift collar, wherein said shift arm extends through a window formed in said case.

4. The selectively lockable differential assembly as recited in claim 3, wherein said actuator assembly further comprises:

a shift fork; and a linear actuator;

wherein said shift fork partially encircles said shift collar and is attached to said linear anchor whereby translation of said linear actuator causes translation of said shift collar and rotation of said pinion shaft about said centerline axis.

5. The selectively lockable differential assembly as recited in claim 4, wherein said linear actuator comprises a vacuum motor.

6. The selectively lockable differential assembly as recited in claim 1, wherein:

said case includes first and second stepped bores formed therein;

said pinion shaft further includes first and second generally cylindrical end portions each being disposed in one of said stepped bores;

said cam portion is disposed intermediate said end portions.

7. The selectively lockable differential assembly as recited in claim 6, further comprising:

first and second snap rings each being attached to one of said end portions of said pinion shaft and disposed in an enlarged diameter outer portion of a corresponding one of said stepped bores;

wherein said first and second snap rings cooperate with said case so as to prevent translation of said shaft in a direction substantially parallel to said longitudinal centerline axis.

8. The selectively lockable differential assembly as recited in claim 1, wherein said cam portion has a generally elliptically-shaped cross-section.

9. The selectively lockable differential assembly as recited in claim 1, wherein said first and second output shafts comprise first and second axle output shafts.

10. The selectively lockable differential assembly as recited in claim 1, wherein said differential mechanism further includes first and second pinion gears rotatably mounted on said pinion shaft, said first and second pinion gears being longitudinally spaced on said pinion shaft.

11. The selectively lockable differential assembly as recited in claim 10, wherein:

said differential mechanism further includes a first side gear rigidly affixed to one of said output shafts for rotation therewith and a second side gear rigidly affixed to the other of said output shafts for rotation therewith;

said first and second side gears meshingly engage said first and second pinion gears.

12. The selectively lockable differential assembly as recited in claim 11, wherein:

said at least one clutch comprises a first plurality of disks connected to one of said side gears for rotation therewith and a second plurality of disks connected to said case for rotation therewith.

13. The selectively lockable differential assembly as recited in claim 12, wherein:

a second clutch comprises a third plurality of disks connected to the other of said side gears for rotation therewith and a fourth plurality of disks connected to said case for rotation therewith;

rotation of said pinion shaft about said centerline axis from said unlocked position to said locked position forces said cam portion against said first and second output shafts thereby forcing said first and second side gears against the corresponding clutches so as to engage said first and second clutches and limit differential rotation between the corresponding output shafts.

14. The selectively lockable differential assembly as recited in claim 13, further comprising:

first and second C-rings each attached to one of said output shafts and disposed in abutting relationship with a corresponding one of said side gears.

15. The selectively lockable differential assembly as recited in claim 11, wherein said first and second side gears comprise bevel gears.

16. The selectively lockable differential assembly as recited in claim 1, wherein said case is rotatably mounted within an axle carrier.

17. The selectively lockable differential assembly as recited in claim 1, wherein said case is rotatably mounted within a transfer case.

18. The selectively lockable differential assembly as recited in claim 17, wherein said first and second output shafts comprise front and rear output shafts.

19. The selectively lockable differential assembly as recited in claim 1, wherein first and second clutches are provided, each being connected to said case and coupled with one of said output shafts.

20. The selectively lockable differential assembly as recited in claim 19, wherein:

said first clutch is connected to one of said side gears and said case;

said second clutch is connected to the other of said side gears and said case;

wherein rotation of said pinion shaft about said longitudinal axis from said unlocked position to said locked position engages said first and second clutches so as to couple said first and second shafts to said case for rotation therewith.

* * * * *